United States Patent

Montaclair et al.

[11] Patent Number: 5,578,100
[45] Date of Patent: Nov. 26, 1996

[54] BAG FILTERS FOR DUST-LADEN GAS FILTRATION

[75] Inventors: Jean-Paul Montaclair, Poissy; Serge Carre, Houilles, both of France

[73] Assignee: Hamon Industrie Thermique, Levallois-Perret, France

[21] Appl. No.: 433,350

[22] PCT Filed: Sep. 5, 1994

[86] PCT No.: PCT/FR94/01041

§ 371 Date: Jun. 27, 1995

§ 102(e) Date: Jun. 27, 1995

[87] PCT Pub. No.: WO95/07130

PCT Pub. Date: Mar. 16, 1995

[30] Foreign Application Priority Data

Sep. 6, 1993 [FR] France ............................ 93 10570
Sep. 6, 1993 [FR] France ............................ 93 10571

[51] Int. Cl.⁶ .................................................. B01D 29/15
[52] U.S. Cl. ..................... 55/341.1; 55/364; 55/379; 55/380; 55/DIG. 12
[58] Field of Search ........................... 55/341.1–341.7, 55/364, 372, 378–381, 492, 508, DIG. 12

[56] References Cited

U.S. PATENT DOCUMENTS

| | | | |
|---|---|---|---|
| 1,835,093 | 12/1931 | Ruemelin | 55/378 X |
| 2,533,268 | 12/1950 | Lanter | 55/379 X |
| 3,092,479 | 6/1963 | Hedberg | 55/341.1 |
| 3,097,939 | 7/1963 | Schneider et al. | 55/378 |
| 3,354,620 | 11/1967 | Scholl et al. | 55/341.1 X |
| 3,791,111 | 2/1974 | Kroll | 55/341.1 |
| 4,010,015 | 3/1977 | Brown | 55/378 X |
| 4,046,526 | 9/1977 | Phillippi | 55/341.1 X |
| 4,089,664 | 5/1978 | Noland | 55/341.1 |
| 4,913,815 | 4/1990 | Shulda | 55/372 X |
| 5,173,098 | 12/1992 | Pipkorn | 55/379 |
| 5,178,652 | 1/1993 | Hüttlin | 55/341.1 X |
| 5,277,704 | 1/1994 | Miller et al. | 55/378 X |
| 5,409,515 | 4/1995 | Yamamoto et al. | 55/341.1 |

FOREIGN PATENT DOCUMENTS

| | | | |
|---|---|---|---|
| 4016206 | 11/1991 | Germany | 55/379 |
| 4029994 | 3/1992 | Germany | 55/379 |
| 2117266 | 10/1983 | United Kingdom | 55/341.7 |

Primary Examiner—Robert Spitzer
Attorney, Agent, or Firm—Larson and Taylor

[57] ABSTRACT

A bag (1) for filtering dust-laden gas in a bag filter that extends between a perforated plate (22) having holes (23) and support and positioning structure adjacent to a far end (17) of a filter box, is in the form of a tubular bag made from a U-shaped tube (1) having a flexible filtering wall that is permeable to the gas but that retains the dust transported thereby, the gas penetrating into the bag (1) and flowing in filtered form to an end opening (1f) of the wall that opens out in a hole (23) of the plate (22). The U-shaped tube of the bag (1) is mounted in the enclosure in such a manner as to present two tubular filtering lengths (1a, 1b) that are substantially parallel, with the base (1c) thereof being pinched to form a substantially gastight joint and being disposed towards the far end (17) of the enclosure. The invention is applicable to bag filters for cleaning dusty premises, and to filtering discharges made to the outside.

16 Claims, 4 Drawing Sheets

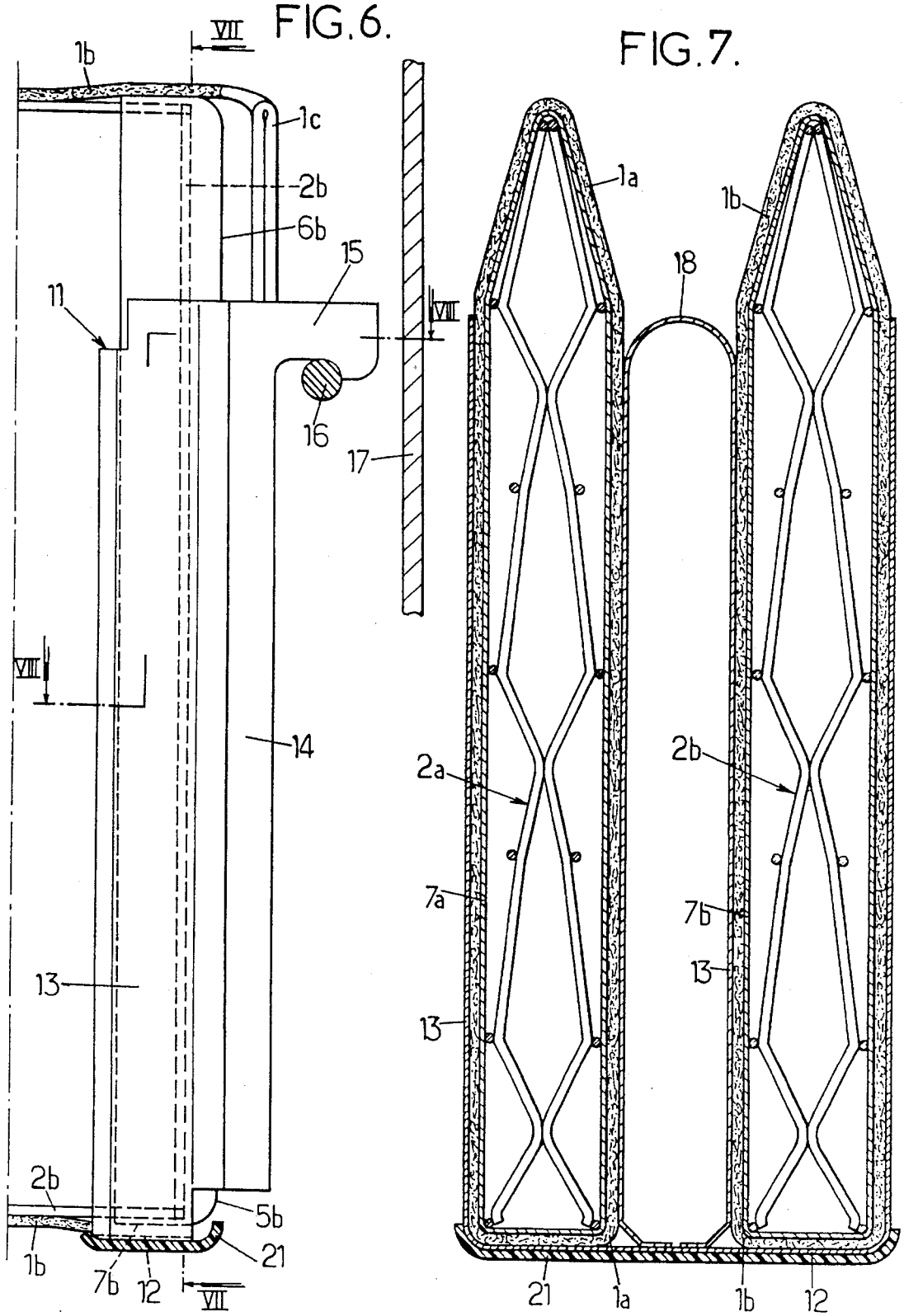

BAG FILTERS FOR DUST-LADEN GAS FILTRATION

The invention relates to improvements applied to bag filters for filtering dust-laden gas, as used to avoid polluting the environment when discharging air to the outside, and for cleaning industrial and/or commercial premises in order to improve the working conditions of personnel and the productivity and the performance of machines that generate dust, but that are sensitive to the presence of dust in the surrounding air, thereby obtaining a quality environment for personnel and for machines.

In general, bag filters known for this purpose comprise an inlet hood for dust-laden gas, in general air, a filter proper, an outlet hood for filtered or "dust-free" gas, an unclogging device, and a device for removing filtered dust.

The inlet hood for dust-laden gas, whose location and shape may be adapted to any configuration, may be in the form of a rectangular parallelepiped, and it may be disposed over the filter proper, assuming that it has horizontal filter bags.

The filter proper includes an enclosure organized as an airtight box containing a battery of tubular filter bags, e.g. of substantially cylindrical or oval section each having a filtering wall, the bags extending parallel to one another and being disposed either vertically or else horizontally between a perforated plate and, in a particular embodiment of the prior art, supporting rods and/or plates and corrugated positioning rods adjacent to a far end of the box remote from its side having the perforated plate. The dust-laden air penetrates into the box from the inlet hood and is then sucked into the insides of the bags, each constituted by a flexible filter medium that is permeable to air (generally a needled felt), on which dust particles having a diameter greater than 0.5 μm, or perhaps greater than only 0.1 μm are deposited. The dust stopped on the outer lateral surface of the bags is then expelled from the bags by an unclogging operation, by blowing back gas in the reverse direction through the bags.

The hood for filtered gas is connected to a gas recirculation duct and is generally in the form of a rectangular parallelepiped, being placed adjacent to the filter box and facing the perforated plate to collect clean gas leaving the filter bags via their end openings each of which is retained in airtight manner, e.g. by an end flange, in a respective hole in the perforated plate. The filtered gas hood is provided with doors giving access to the perforated plate for maintenance and cleaning operations on the filter bags.

The tubular filter medium of each bag is supported, between the perforated plate and the support and positioning means adjacent to the end of the box, by a frame constituted by a basket in the form of a grid, e.g. made of longitudinal and transverse metal wires that are welded together. These gridded supports are of a special shape, of elongate cross-section and oriented vertically, and they may present a roof-shape having two sloping flats extended downwards by corrugated side walls. These gridded baskets supporting the tubular filter bags of substantially oval cross-section with the long axis vertical serve not only to support the filter media in operation, ensuring that there is little mechanical deformation of the media so as to keep fine dust retention qualities intact and to prevent crumpled bags coming into contact with adjacent bags, but also to facilitate installation of the bags in the perforated plate and on the support and positioning means close to the end, and similarly to facilitate withdrawal of the bags. Because of the baskets that they surround, the bags maintain a central section with non-zero flow in spite of the pressure of dust-laden gas which tends to close up each bag, and the roof-shaped top portions of the bags facilitates the shedding of dust towards the collecting hopper, if the bags are horizontal.

Those known bag filters have numerous drawbacks because of the structure of the bags with which they are fitted and because of the retaining and positioning means for the rear portions of the bags adjacent to the end of the filter. Each bag comprises a single tubular length whose rear end remote from its opening that is retained in one of the holes of the perforated plate, may be closed by the end being stitched together. The thread used must therefore be selected as a function of the chemical aggressivity of the gas to be filtered, which chemical aggressivity can vary from one installation to another. Stitching an end together constitutes work that is difficult in that it requires expensive mechanical or manual intervention. The stitched end also constitutes a zone in which there is a risk of leakage, since the holes through which the stitching thread passes are larger in size than the particles of dust to be stopped, such that all of the stitching holes must be closed up using a special substance if it is desired to guarantee a degree of quality for the filtered gas.

In the event of a leak in a bag (e.g. through the filter medium being torn on the end of a metal wire of its gridded basket), the punctured bag inflates and fills up with dust-laden gas. Since the filter bags are disposed in the immediate proximity of one another, a punctured and inflated bag cannot be withdrawn without also removing a plurality of adjacent bags, which means that it is the practice for the punctured bag to be plugged at its opening in the perforated plate using a stopper, while waiting for a programmed stop to replace the punctured bags.

Replacing a bag of the above type is a difficult operation since, depending on circumstances, it may be necessary to act on the sealing and retaining rim that engages the perforated plate, and above all it is necessary to guide the replacement bag accurately while it is being installed so that its end and the corresponding end of the gridded basket engage appropriately, e.g. in the corresponding corrugation of the corrugated rod of the support and positioning means adjacent to the end of the box. Given the great length of the bags, which may be as much as 2.8 meters (m) for a width of 50 mm and a height lying in the range 150 mm to 250 mm, it will be understood that the operator can easily place the end of a bag in a corrugation adjacent to the corrugation intended for receiving it, and that such a positioning error can be carried forward from bag to bag all the way to the end of a row, which error may be discovered late, thereby requiring difficult, lengthy, and repetitive corrective manipulation to be performed.

In addition, industrial manufacture of bags requires them to be provided in two or three standard lengths only, so as to limit manufacturing costs. Filter bags must be produced in a factory prior to being mounted and, when renovating or changing bags on an existing installation, it is not possible, on site, to adapt the lengths of the bags to the length required in the existing installation.

An object of the invention is to remedy these drawbacks of known filter bags, and to propose filter bags that are simple in structure, cheap to manufacture, easy to install and to withdraw, and usable in such a manner as to guarantee the integrity of the filter medium without it being necessary to provide a stitched end.

To this end, the invention provides a bag filter comprising for filtering dust-laden gas, in which a plurality of bags extend inside an enclosure between a perforated plate of the enclosure having holes, and supporting and positioning means adjacent to a far end of the enclosure, the bags being disposed substantially transversely to a flow of dust-laden gas that penetrates into the enclosure, each tubular bag having a flexible filtering wall that is permeable to the gas but that retains the dust transported by the gas which penetrates into the bag and flows in a filtered state therealong to an end opening of the wall which opens out into a hole of the perforated plate, the filter of the invention being characterized in that at least one bag is constituted by a U-shaped tube and is mounted in the enclosure in such a manner as to present two tubular filtering lengths that are substantially parallel and that are connected to each other via a base disposed towards the end of the enclosure.

Advantageously, the tube of each U-shaped bag is cut to the desired length from a seamless and continuous tube, and is then folded to take up the desired U-shape.

Cutting to length and folding into a U-shape can be performed equally well in the factory or on site. The U-shaped tube structure thus given to the filter bag is less expensive than known embodiments, and it does not have a stitched end which constitutes a source of many drawbacks.

The tube from which the bag is cut may be of any section, and is preferably of substantially oval section like the bags presently in use, or else it could possibly be circular in section.

To facilitate installation and withdrawal of U-shaped bags, and to enable the base of the U-shape to be positioned without risk of error on the support and positioning means at the far end of the enclosure, the end openings of the two tubular filtering lengths of each U-shaped bag open out side by side in the same hole of the perforated plate. Advantageously, this results in the perforated plate being provided with holes of larger section than the holes in known plates, for example holes that are 130 mm wide instead of being 50 mm wide, for an unchanged height of 150 mm to 250 mm. This provides better accessibility both during installation and during withdrawal of bags.

Advantageously, each U-shaped bag is mounted in the enclosure in such a manner that its base is sufficiently pinched to form a joint that is relatively gastight between the two tubular filtering lengths.

In addition, each U-shaped bag may be supported between the perforated plate and the support and positioning means for the far end of the bag by means of a frame constituted by two perforated baskets each inserted in a respective one of the two tubular filtering lengths, each basket possibly being of conventional type, i.e. being gridded and made of welded-together metal wires, for example.

In addition, in prior art filter bags, the corrugated rod support and positioning means are unsuitable for receiving the bases or rear portions of U-shaped bags of the type proposed by the invention.

Another object of the invention is thus to remedy this drawback of known bag filters and to propose support and positioning means for the rear portions of U-shaped filter bags having two tubular filtering lengths that are interconnected by a base located near the end of the filter box.

To this end, the invention proposes that for each U-shaped bag, the support and positioning means comprise at least one support bar adjacent to the far end of the filter enclosure, and a support, positioning, and gastight closure device for the base of the U-shaped bag, the device comprising:

for each filtering length, an endpiece comprising an end and a peripheral skirt which engages resiliently by means of its skirt around the rear end of the basket in being inserted between the basket and the filtering length, with the end thereof constituting a gastight closure wall for the rear end of said filter length; and an outer pin that is substantially U-shaped, and that engages resiliently on the base of the filter bag in such a manner as to pinch the wall of the rear end of each filter length between the pin and the corresponding endpiece, each branch of the U-shaped pin having hooking means on its side facing away from the filter bag, which hooking means are suitable for engaging on at least one support and positioning bar secured to the end of the bag filter.

Thus, by closing the rear end of the basket and by resiliently pinching the wall of the rear portion of the bag between the endpiece on the inside and the U-shaped pin on the outside, sealed closure is ensured towards the rear of the bag without it being necessary to stitch an end. In addition, the hooking means of the external U-shaped pin make it possible to support and position the rear portion of the bag on at least one support bar, which bar may be rectilinear and provided with regularly spaced-apart abutments for ensuring positioning near the far end of the filter box.

With the filter bag being of the U-shaped type, the device advantageously also includes an elastically deformable inner spacer that engages resiliently inside the U-shaped pin between the rear ends of the two filtering lengths engaged in the U-shaped pin, thereby resiliently pinching said rear ends between the U-shaped pin and the spacer on the outside and the endpieces engaged in said rear ends on the inside.

In order to facilitate installation of a new bag and withdrawal of a used bag, while improving longitudinal guidance thereof, the device advantageously further includes a sliding shoe fixed beneath the base of the U-shaped pin. Thus, the shoe rests on and can slide along the bag below while a bag is being installed or withdrawn, with this being particularly advantageous during withdrawal since a damaged bag is relatively heavy, being clogged on the inside.

In order to enable the parts such as each endpiece, the U-shaped pin, and the central spacer to be fixed by resilient engagement for the purpose of being held in place, said parts are preferably made of stamped sheet metal, in particular of thin stainless steel sheet, thereby obtaining a spring effect enabling the parts to adapt to various thicknesses of the tubular walls of the bags, and to tolerances in the positioning and the manufacture of said parts themselves, and also of the basket(s).

In addition, each branch of the U-shaped pin advantageously extends away from the filter bag in the form of a folded flat projecting towards the other branch of the U-shaped pin, and shaped to provide the hook for hooking on the support and positioning bar, thereby stiffening the pin and ensuring that positioning and support are always provided by metal-on-metal contact, without causing the wall of the bag to be pinched.

In preferred embodiments, use is also made of one or more of the following dispositions:

the end of each endpiece has a central stiffening deformation, improving resilient engagement of the endpiece on the basket;

each endpiece is fastened to the corresponding perforated basket by means of at least one tab that is received in an opening of the basket, each fastening tab being made by punching out a portion from the skirt of an endpiece and being folded on assembly;

the inner spacer is a hollow section member that is substantially in the form of an O-shape that is split along a generator line in its portion facing the base of the U-shaped pin;

the elastically deformable spacer is engaged in the U-shaped pin so as to come into abutment against the base of said pin; and the edges of the branches of the U-shaped pin and of the resiliently spacer facing away from the hooking means of the pin are provided with respective ribs projecting towards the skirts of the endpieces, and disposed slightly in front of the free edges of said skirts.

Other advantages and characteristics of the invention appear from the following non-limiting description of an embodiment which is described with reference to the drawings, in which:

FIG. 6 is a diagrammatic view partially in side elevation and partially in section showing the rear portion of a U-shaped bag which is held and positioned by the device of the invention;

FIG. 7 is a cross-section on VII—VII of FIG. 6; and

Figure 1:
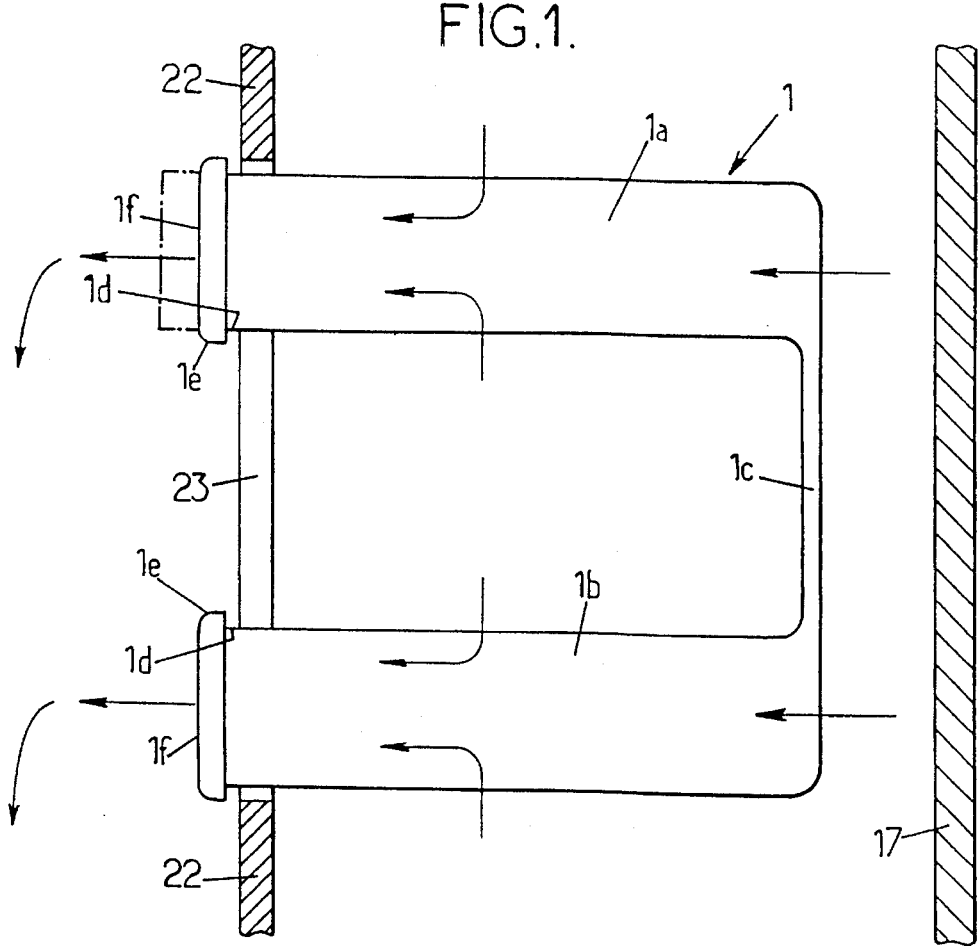
FIG. 1 is a diagram, partially in plan view and partially in horizontal section, showing a U-shaped filter bag disposed in a filter box.
Figure 2:
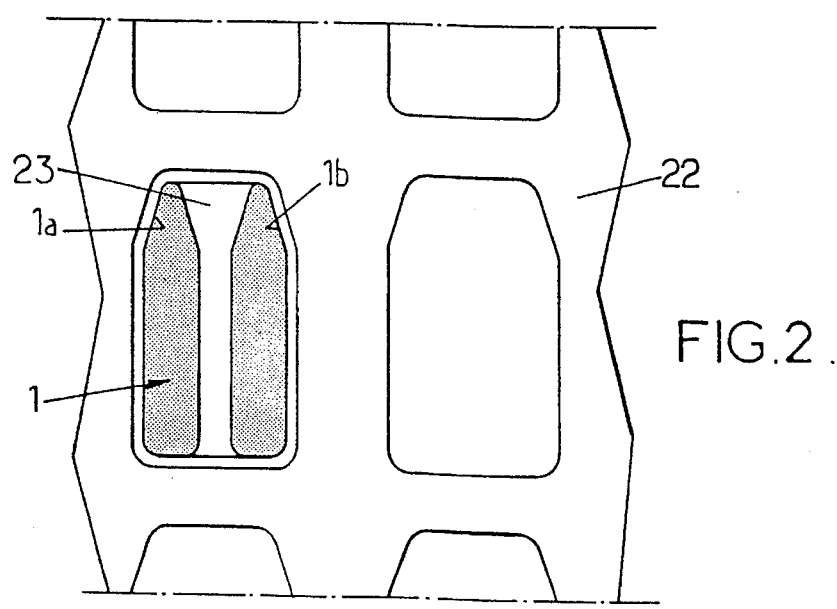
FIG. 2 is a fragmentary elevation view showing the front of the perforated plate of the FIG. 1 filter box, and with the two tubular filtering lengths of a U-shaped bag being visible side by side in one of the holes of the plate.

FIGS. 1 and 2 are diagrammatic, being neither to scale nor in proportion, and they show a vertical perforated plate 22 which is pierced by a large number of holes regularly spaced apart in vertical and horizontal rows, such as the hole 23, which holes are substantially rectangular in shape, each having a trapezium-shaped top portion, and being about 130 mm wide and 150 mm to 400 mm tall.

FIG. 1 shows the vertical far end 17 that is parallel and opposite to the plate 22 when the filter box is made as an enclosure in the form of a rectangular parallelepiped.

Filter bags 1, each constituted by a U-shaped tube, and only one of which is shown in FIGS. 1 and 2, are mounted in the filter box. Each bag 1 is a tubular element of substantially oval cross-section, made of a flexible filter medium suitable for removing dust from air or from any other gas, and which has merely been cut to the desired length from a very long roll of a seamless and continuous tube that possibly has no stitching in the filter medium. The cutoff length is directly usable, and compared with prior art filter bags, it is mechanically stronger and chemically more resistant since it has no zones that are at risk or weakened. In addition, the tubular element is cut to the appropriate length to fit in the filter box without difficulty and regardless of the space available between the perforated plate 22 and the end 17.

Starting from a tubular element cut to the desired length, either in the factory or on site, it suffices to fold the element into a U-shape so as to obtain a usable bag 1 having two tubular filtering lengths 1a and 1b that are substantially parallel and of the same length, and that are connected to each other via a base 1c. The free ends 1d of the two filtering lengths 1a and 1b are engaged in the same hole 23, and each of them is turned back at 1e so as to be retained in sealed manner on a cover (not shown) for mechanical connection to the plate 22 and for closing the hole 23 around the ends 1d. In this way, the end openings 1f of the two filtering lengths 1a and 1b of the same bag 1 open out substantially side by side in the same hole 23 of the plate 22.

The gas (e.g. air) flows along the arrows in FIG. 1: while still laden with dust, it penetrates into the box between the plate 22 and its far end 17, it passes through the flexible filtering wall of the bag 1, leaving the dust on the outside face of the bag 1, and it then flows in the dust-free or "filtered" state in an axial direction along each of the two lengths 1a and 1b, and then escapes via the openings 1f into a hood for collecting filtered gas (not shown).

If the wall of the bag 1 is punctured, then the bag inflates and fills up with dust-laden gas. It then suffices to withdraw the adjacent bag 1 through the corresponding hole 23 to gain access to the bag 1 that is inflated between the plate 22 and the end 17 for the purpose of tearing it, thus enabling the damaged bag to be extracted without difficulty through its own hole 23. The size of the holes 23 is sufficient to enable these operations to be performed by an operator who can see what he is doing. After the faulty bag has been replaced and the adjacent bag 1 has been put back into place, the filter is back in working order. This is achieved by operations that can be performed quickly and that are simple, that do not require specialized personnel to intervene, and there is no need to shut off any of the openings 1f.

Nevertheless, it is preferable for the base 1c of each U-shaped bag 1 to be pinched shut by any appropriate mechanical means (not shown in FIGS. 1 and 2, but with an example thereof being described below with reference to FIGS. 3 to 8), which means may simultaneously contribute to supporting and positioning the U-shaped bag 1 by means of its base 1c engaging the end 17. The pinched base 1c then forms a joint that is sufficiently gastight between the two tubular filtering lengths 1a and 1b to prevent inflation of one of the lengths 1a or 1b by dust-laden air due to that length being pierced causing the other length 1b or 1a to be inflated also. It is then possible and indeed easy to plug temporarily the opening if of the inflated length 1a or 1b without any need to remove the corresponding U-shaped bag 1 whose other filtering length 1b or 1a remains effective for filtering purposes.

The U-shaped bag 1 is supported between the plate 22 and the end 17 by a perforated frame that is also used for insertion or withdrawal purposes by passing through the hole 23. This frame may be constituted simply by two gridded baskets of known shape and structure, each of which is engaged in a respective one of the tubular lengths 1a and 1b, the two baskets being suitable for being moved together by a central rod or stick, which is fixed rigidly but in removable manner to each of the baskets, for installation or withdrawal purposes.

The U-shaped bag 1 made in this way is very cheap and very simple to implement.

Figure 3:
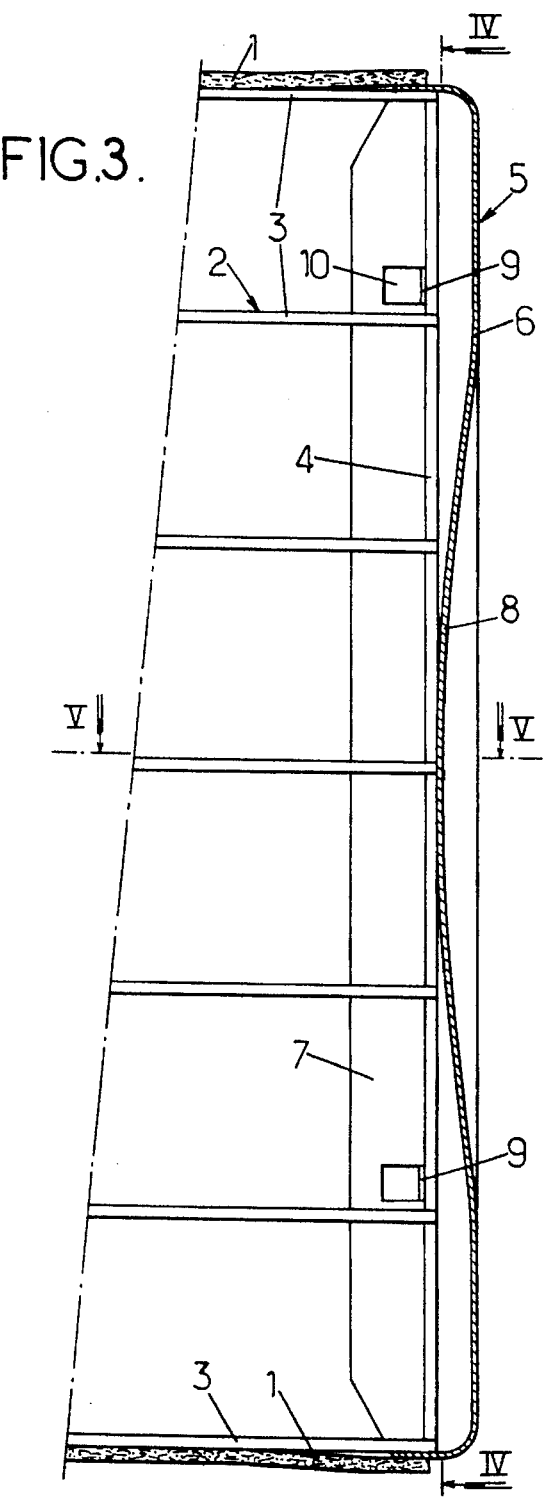
FIG. 3 is a diagrammatic view partially in section and partially in side elevation of an endpiece mounted at the rear end of a filtering length of a bag.
Figure 4:
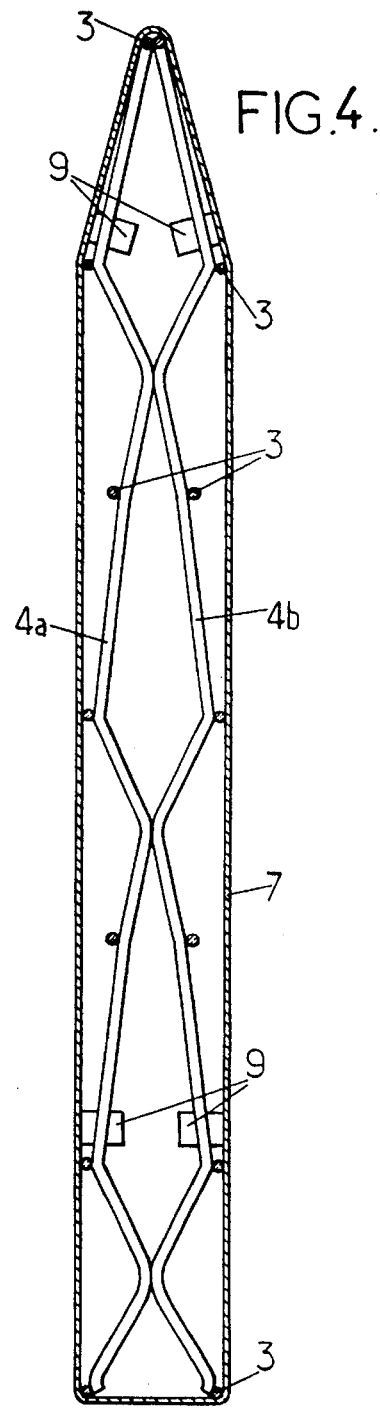
FIG. 4 is a section view on IV—IV of FIG. 3, showing the endpiece mounted on the rear end of the basket.
Figure 5:
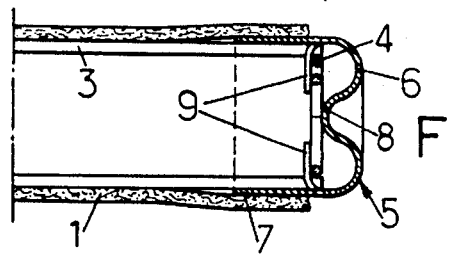
FIG. 5 is a section view on V—V of FIG. 3.

In FIGS. 3 to 5, there can be seen a horizontal bag 1 for filtering gas-laden air, the figures showing the filtering wall of the rear end portion of a tubular filtering length. The bag may have a single filtering length even though in this example it is constituted by a U-shaped bag having two lengths. The filtering wall of each length of the bag 1 is of highly flattened substantially oval cross-section that extends vertically, and it is fitted over a gridded basket 2. The basket 2 is made up of parallel longitudinal metal wires 3 which are welded to regularly spaced-apart cross-frames 4, each being constituted by two corrugated metal wires 4a and 4b that bear against each other via the inside crests of their corrugations, and whose top portions slope to form a roof-shape.

An endpiece 5 including an end 6 connected via a rounded portion around its entire periphery to a skirt 7 that extends substantially perpendicularly to the general plane of the end 6 is resiliently engaged by means of the skirt 7 around the rear end of the gridded basket 2. The end 6 is of a shape that surrounds the rearmost cross-frame 4 of the basket 2, i.e. it is in the form of a tall and narrow rectangle that is extended at its top end by an isosceles triangle. A stiffening rib 8 is provided extending vertically downwards in the central portion of the end 6, projecting in the same direction as the skirt 7, to a depth that tapers from the center of the deformation towards its ends. The endpiece 5 is made, for example, by being stamped from a sheet of stainless steel that is 0.8 mm thick. The endpiece 5 is resiliently engaged on the basket 2 by inserting its skirt 7 between the length of bag 1 and the basket 2 until the rib 8 comes into abutment against the rear end cross-frame 4 of the basket 2. This rib 8 has the effect of improving the resilient engagement of the endpiece 5 on the basket 2. The endpiece 5 is held in place by tabs 9 that are folded on assembly, which tabs are formed by punching out portions 10 of the skirt 7. The endpiece 5 is thus held on the basket 2 by means of the tabs 9 which are folded behind the far sides of the wires 4a and 4b constituting the rear end cross-frame 4 of the basket 2 as seen from the end 6.

In a variant, the tabs 9 may be made in such a manner as to engage the basket 2 resiliently.

Figure 8:
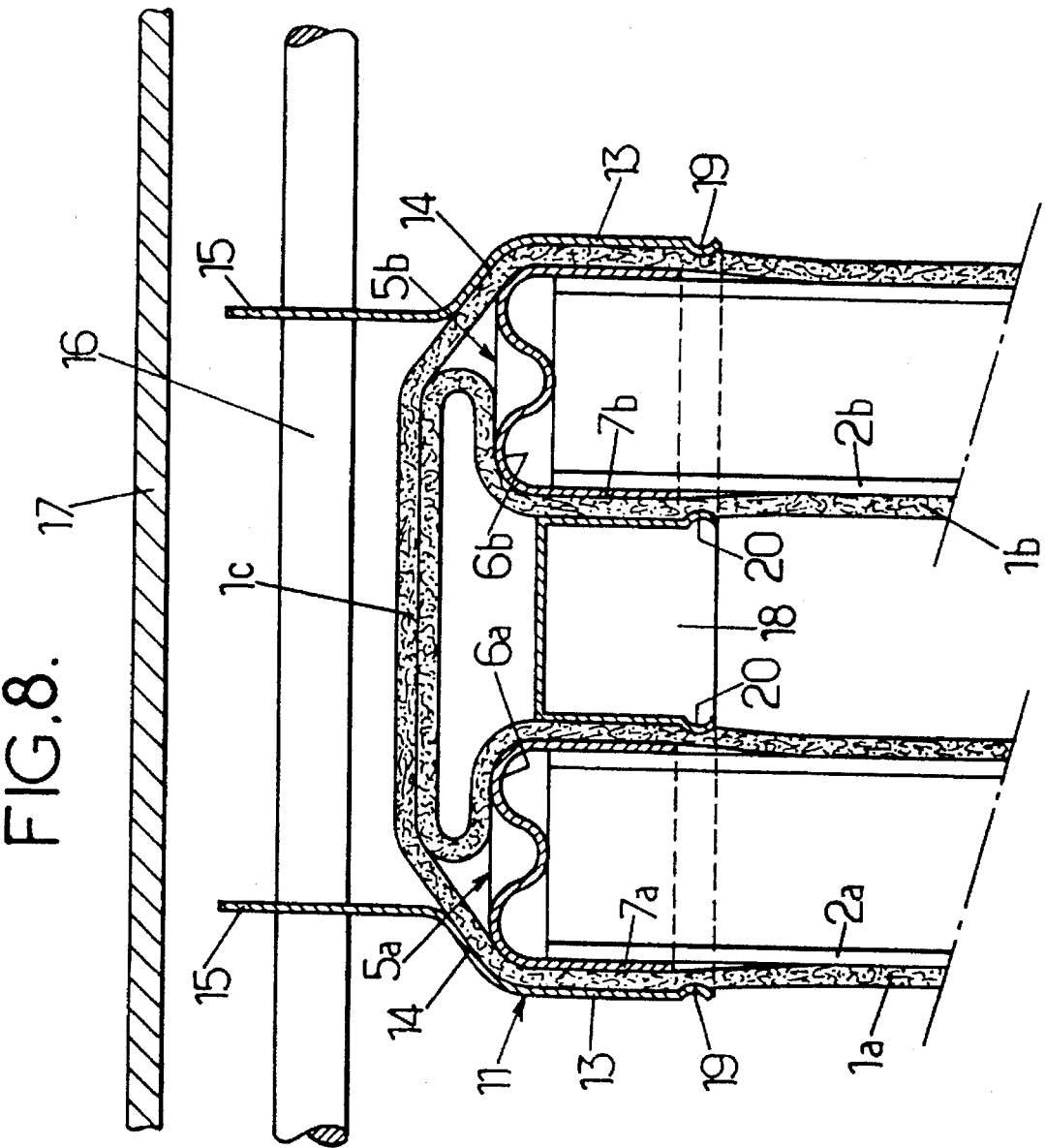
FIG. 8 is a section on VIII—VIII of FIG. 6.

FIGS. 6 to 8 show the support, positioning, and sealed closure device fitted to the rear portion of the U-shaped filter bag each of whose two tubular filtering lengths has its wall fitted over a respective one of two baskets, on which two endpieces 5 are mounted in the manner described above with reference to FIGS. 3 to 5.

In FIG. 8, it can be seen that the wall of one of the filtering lengths 1a of the U-shaped bag is connected to the wall of the other filtering length 1b via a base 1c which is pinched shut. Two endpieces 5a and 5b, identical to the endpiece 5 of FIGS. 3 to 5, are resiliently engaged in the manner described above on the rear ends of respective baskets (2a and 2b) received in the lengths 1a and 1b.

As shown in FIGS. 6 to 8, the device also includes an outer pin 11 that is U-shaped, having a base 12 and two resiliently deformable parallel branches 13. This U-shaped pin 11 is resiliently engaged by means of its branches 13 and its base 12 around the skirts 7a and 7b and the rounded connection portions connecting them to the ends 6a and 6b of the endpieces 5a and 5b, and also around the corresponding portions of the lengths 1a and 1b. The rear end walls of the two filtering lengths 1a and 1b are thus pinched between the outer pin 11 and the corresponding endpiece 5a or 5b. To improve the stiffness of the outer pin 11, each of its branches 13 extends from the base 12 towards the base 1c of the U-shaped bag in the form of a flat 14 that is folded towards the other branch 13 and whose top edge is provided with a hook shape 15 for hooking and positioning the device on a rectilinear support and positioning bar 16 connected to the filter box, close to the far end 17 thereof.

Since the bag is U-shaped, the device also includes an inner spacer 18 that is elastically deformable and that engages resiliently inside the U-shaped pin 11 between the rear ends of the two filtering lengths 1a and 1b engaged in the U-shaped pin 11 in such a manner as to cause the walls of the lengths 1a and 1b to be pinched with good gastight sealing between the corresponding endpiece 5a or 5b that is engaged inside the bag and the spacer 18, and the two branches 13 of the U-shaped pin 11 outside the bag.

Like the U-shaped pin 11 and each of the endpieces 5a and 5b, the spacer 18 is made by being stamped out from steel sheet, thereby benefitting from good resilient deformation properties for engagement purposes. The spacer 18 is constituted by a rectangular strip whose width corresponds to the base 12 of the pin 11, and which is folded over so as to constitute a section member of highly elongate O-shape, which is rounded at its top end, which has two side faces that are plane and parallel, and which has a bottom portion constituted by the two ends of the strip coming closer together, being folded flat but leaving a gap in the middle on a generator line so as to be pressed against the base 12 of the pin 11, as shown in FIG. 7.

To improve the pinching and airtight retention of the walls of the lengths 1a and 1b of the bag between firstly the endpieces 5a and 5b, and secondly the U-shaped pin 11 together with the inner spacer 18, the edges of the branches 13 of the pin 11, on their sides opposite from the flats 14, are shaped so as to project inwardly, thereby forming a rib 19, and the facing edge of the two sides of the inner spacer 18 has an analogous outwardly-directed projection that likewise forms a rib 20, so that the ribs 19 and 20 project towards the skirts 7a and 7b of the endpieces 5a and 5b, slightly in front of the free edges of said skirts, thereby providing better retention of the walls of the lengths 1a and 1b. In addition, the ribs 19 and 20 stiffen the edges of the pin 11 and of the spacer 18, and prevent the bag 1 from being torn.

Finally, a sliding shoe 21, e.g. made of polytetrafluoroethylene (PTFE), is fixed beneath the base 12 of the pin 11. This shoe 21 is turned up in a rearwards direction and possibly also laterally about the bottom ends of the branches 13, and it serves to slide on the top ends of the two tubular filtering lengths of a U-shaped bag disposed beneath the bag in question, thereby facilitating guidance and displacement thereof while it is being inserted and withdrawn. The shoe 21 also ensures that the hooks 15 of the pin 11 of the device will hook onto the bar 16 that is situated at the appropriate horizontal level.

In the event of the device for supporting, positioning, and airtight closure is to be used on a bag having a single tubular filtering length, then the central spacer 18 is clearly not useful, and the U-shaped pin 11 must be adapted accordingly by having its branches 13 and flats 14 disposed closer together so that its branches 13 serve to pinch the filtering walls of the bag resiliently against the two opposite sides of the skirt 7 of the corresponding endpiece 5.

We claim:

1. In bag filter apparatus comprising a plurality of tubular filter bags for filtering dust-laden gas and extending inside an enclosure between a perforated plate having holes, and a remote region of the enclosure, the bags being disposed substantially transversely to a flow of dust-laden gas that, in use of the apparatus, penetrates into the enclosure, each tubular bag having an end opening which opens into a respective hole of said perforated plate and having a flexible filtering wall that is permeable to the dust-laden gas but that retains the dust transported by the gas which penetrates into the bag and flows in a filtered state therealong to said end opening the improvement wherein at least one of said filter bags comprises a U-shaped tube mounted in the enclosure in such a manner as to present two tubular filtering lengths that are substantially parallel and that are connected to each other via a base disposed towards said remote region of the enclosure, the end opening of each of the two tubular filtering lengths of said U-shaped bag opening out side by side in the same hole of said perforated plate.

2. Bag filter apparatus according to claim 1, wherein said U-shaped bag comprises a seamless and continuous tube folded into said U-shape.

3. Bag filter apparatus according to claim 2, wherein said U-shaped bag is formed from a tube whose cross-section is substantially oval or circular.

4. Bag filter apparatus according to claim 1, wherein the base of said U-shaped bag is sufficiently pinched to form a relatively gastight joint between the two tubular filtering lengths thereof.

5. Bag filter apparatus according to claim 1, wherein said U-shaped bag is supported by, a frame comprising two perforated baskets each being inserted in a respective one of the two tubular filtering lengths.

6. Bag filter apparatus according to claim 5, further comprising:

support and positioning means comprising a support bar adjacent to said remote region of said enclosure; and a support, positioning, and gastight closure device for the base of the U-shaped bag, said closure device for each filtering length, an endpiece comprising an end and a peripheral skirt said endpiece resiliently engaging, by means of said skirt, around the rear end of a respective basket, said skirt being inserted between said respective basket and said filtering length, with said end of said endpiece constituting a gastight closure wall for the rear end of said filter length; and an outer pin that is substantially U-shaped, having a base and two legs, and that engages resiliently on said base of the filter bag in such a manner as to pinch the wall of the rear end of each of said filtering lengths between said pin and a respective endpiece, each leg of the U-shaped pin having hooking means on its side facing away from the filter bag, said hooking means engaging on said support bar.

7. Bag filter apparatus according to claim 6, further comprising, for each U-shaped bag, an elastically deformable inner spacer that engages resiliently inside said U-shaped pin between ends of the two filter lengths engaged in the U-shaped pin so as to pinch said rear ends resiliently between, on the outside, the U-shaped pin and the spacer, and, on the inside, the endpiece of each of said filtering lengths.

8. Bag filter apparatus according to claim 7, wherein the inner spacer comprises a hollow section member that is substantially in the form of an O-shape that is split along a generator line in its portion facing the base of the U-shaped pin.

9. Bag filter apparatus according to claim 7, wherein the elastically deformable spacer is engaged in the U-shaped pin so as to come into abutment against the base of said pin.

10. Bag filter apparatus according to claim 7, wherein edges of the legs of the U-shaped pin and edges of the elastically deformable spacer facing away from the hooking means of the pin are provided with respective ribs projecting towards the skirt of said endpiece, and disposed slightly in front of the free edge of said skirt.

11. Bag filter apparatus according to claim 6, further comprising a sliding shoe fixed beneath the base of the U-shaped pin.

12. Bag filter Apparatus according to claim 6, wherein each leg of the U-shaped pin extends away from the filter bag in the form of a folded flat region projecting towards the other leg of the U-shaped pin, and wherein each leg is shaped to provide said hooking means for engaging the support and positioning bar.

13. Bag filter apparatus according to claim 6, characterized in that said endpiece is fastened to said respective basket by means of at least one tab that is received in an opening of the basket.

14. Bag filter apparatus according to claim 13, wherein each fastening tab is made by punching out a portion from the skirt of an endpiece.

15. Bag filter apparatus according to claim 6, wherein the end of said endpiece has a central stiffening deformation, for enhancing the resilient engagement of the endpiece on said respective basket.

16. Bag filter apparatus according to claim 6, wherein said endpiece and the U-shaped pin, are stamped out from metal sheet.

* * * * *